UNITED STATES PATENT OFFICE 2,426,489

OXIDIZED DIMER OF 9,11-LINOLO-DIRICIN-OLEIN AND METHOD OF MAKING SAME

Melvin De Groote, St. Louis, Mo., assignor to Petrolite Corporation, Ltd., Wilmington, Del., a corporation of Delaware No Drawing. Original application July 13, 1945, Serial No. 604,991. Divided and this application May 17, 1946, Serial No. 670,533

5 Claims. (Cl. 260—406)

1

This invention relates to certain new chemical products or compounds and to the manufacture of same, my present application being a division of my co-pending application Serial No. 604,991, filed July 13, 1945.

One object of my invention is to provide new chemical products or compounds that are particularly adapted for use as a demulsifier in the resolution of crude oil emulsions, but which are also adapted for various other uses, as hereinafter described.

Another object of my invention is to provide a practical method of making the said chemical products or compounds.

The new chemical products herein described, particularly when employed as a demulsifier, consists of an oxidized dimer of 9,11-linolo-diricinolein. Oxidation is by means of a gaseous oxygen-containing medium, particularly moist or dry air, and is conducted in the manner commonly used to blow or oxidize castor oil or the like, in the production of blown castor oil. The conventional dehydration of castor oil or ricinoleic acid, or some other ester, results in the formation of a diene acid with the probability that two reactions ordinarily go to approximately the same degree. These reactions may be illustrated in the following manner:

*Reaction 1*

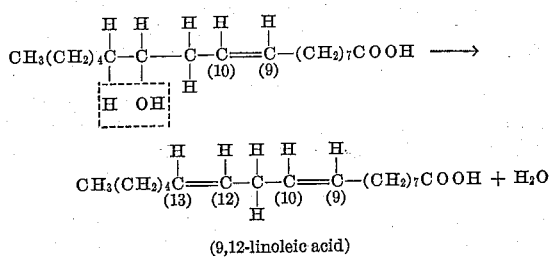

(9,12-linoleic acid)

*Reaction 2*

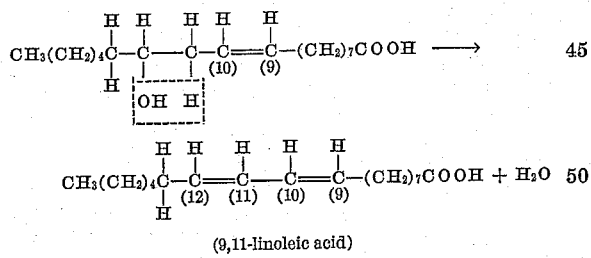

(9,11-linoleic acid)

United States patents which illustrate this procedure, are the following: No. 2,140,271, dated Dec. 13, 1938, to Schwarcman; No. 2,195,225, dated Mar. 26, 1940, to Priester; No. 2,209,065, dated July 23, 1940, to Pelikan; No. 2,212,385, dated Aug. 30, 1940, to Brod; No. 2,226,830, dated Dec. 31, 1940, to Priester; No. 2,226,831, dated Dec. 31, 1940, to Priester; No. 2,261,663, dated Nov. 4, 1941, to Rheineck; No. 2,336,186, dated Dec. 7, 1943, to Nessler; No. 2,351,444, dated June 13, 1944, to Miller; and No. 2,246,768, dated June 24, 1941, to Ubben.

The mixed isomers may be treated so as to convert the unconjugated isomer into the conjugated isomer. This isomerization reaction may be indicated thus:

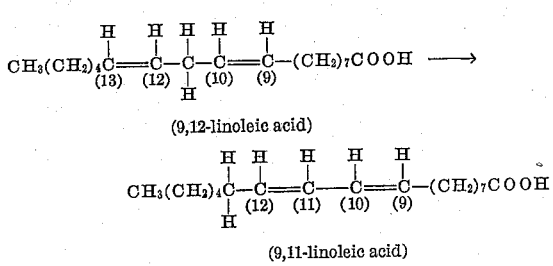

U. S. Patents exemplifying isomerization procedure of the kind indicated, see the following: No. 2,185,414, dated Jan. 2, 1940, to McKinney; No. 2,242,230, dated May 20, 1941, to Burr; and No. 2,350,583, dated June 6, 1944, to Bradley.

9,11-linoleic acid of approximately 80% to 85% purity is obtainable in the open market and also available in the form of the ethyl or methyl ester.

Ignoring matters of cost, I prefer to prepare the monomeric mixed glyceride from this particular product. Methyl or ethyl ricinoleate, which can be prepared in the usual manner or purchased in the open market, is reacted in the customary manner with glycerol monochlorohydrin, using two moles of the ester for one mole of the chlorohydrin. The reaction may be indicated thus:

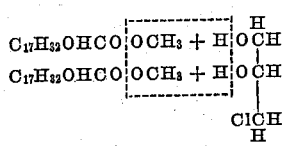

The 9,11-linoleic acid is converted into the anhydrous sodium salt and reacted mole for mole with the above intermediate in the presence of anhydrous alcohol, or some other suitable solvent. This reaction may be indicated thus:

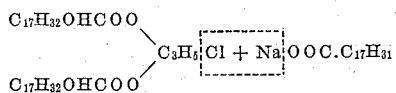

Other alternate procedures may be used, and particularly some in which the percentage of mixed glyceride is not as high in the product obtained by the described procedure, but still sufficiently high for the manufacture of valuable products for the employment of processes herein described.

In regard to the above esterification procedure or alternate procedure, see the comprehensive article entitled "Polyhydric alcohol esters of fatty acids," in Chemical Reviews, volume 3, No. 3, at page 257.

The polymerization of the diene acid is conducted in the same identical manner employed for the polymerization of the methyl ester. The polymerization of the methyl ester is described in various patents, as, for example: U. S. Patent No. 2,325,040, dated July 27, 1943, to Cook et al.; No. 2,347,562, dated Apr. 25, 1944, to Johnston; and No. 2,357,839, dated Sept. 12, 1944, to Evans et al.

The dimerization of the methyl ester may be indicated in the following manner:

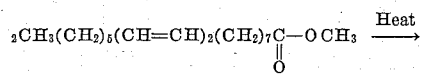

2 mole methyl ester 9,11-octadecadienic acid (originally present and/or formed by isomerization of 9,12 isomer)

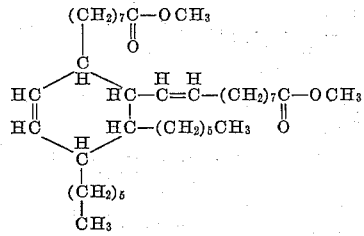

(See U. S. Patent No. 2,347,562, dated Apr. 25, 1944, to Johnson, above mentioned.)

In polymerization of polyene acid esters, it has been found that temperatures between about 250° C. and about 350° C. are suitable for the polymerization. The time required for this polymerization varies not only with the temperature, but with the acid and the particular ester which is used. Generally, a period of from about one-half hour to about 50 hours is suitable, and in most instances, the polymerization may be effected in not over 12 hours. If a conjugated unsaturated ester, such as the methyl ester of eleostearic acid be employed, a sufficient degree of polymerization may be obtained within one-half to one hour at about 300° C., whereas, the methyl linolenates and linoleates, generally, require from about 5 to 12 hours or more. To speed up the polymerization process, suitable catalysts may be added, examples of which are: fuller's earth (preferably acid-treated), bentonite (preferably acid-treated), stannic chloride, etc. If catalysts be employed, it is sometimes possible to use lower temperatures and/or shorter period of time than those indicated above. Substantially the same conditions may be used for dimerization, provided, however, that they must be below the point where dehydration of the ricinoleic acid radical takes place. In other words, in the present instance, the upper temperature limit is approximately 250° C., and, as a result of a somewhat lower temperature, it is sometimes desirable to use a longer time period for isomerization, for instance, a time period as long as twenty-four to forty-eight hours.

Other means for inducing or hastening or catalyzing polymerization of the above described reactants are well known. See, for example, U. S. Patent No. 2,207,686, dated July 9, 1940, to Schwarcman.

In any event, any suitable procedure is used to prepare the mixed glyceride, which has the following formula:

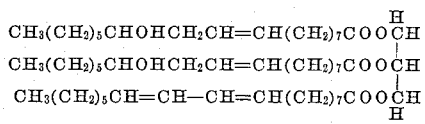

Such mixed glyceride is then dimerized in the manner previously described to produce the dimer of the following formula:

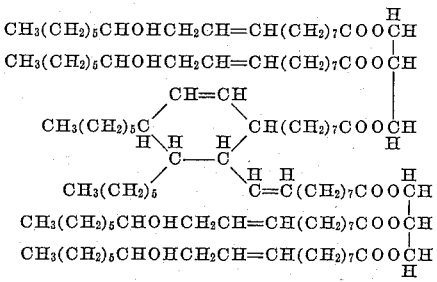

An examination of the preceding formula immediately suggests additional procedures for producing the dimer of the mixed glyceride. For instance, a raw material which can be readily prepared or purchased in the open market is diricinolein. The formula for such product, ignoring isomeric forms, is, of course:

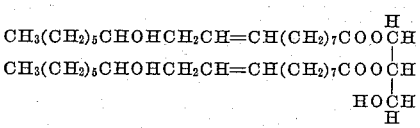

It becomes obvious that if two moles of diricinolein could be reacted with one mole of the dimeric acid which has been previously depicted in the form of a methyl ester, one would then obtain the dimerized mixed glyceride previously described. The objection to such procedure, however, is that reaction cannot be limited to the hydroxyl attached to the glycerol residue, and, in fact, may involve the ricinoleyl hydroxyl radical. Thus, such procedure, although giving fair yields, also gives admixture with other products which preferably are avoided. However, if the methyl ester or ethyl ester of the dimeric acid is used so esterification involves the elimination of the methyl or ethyl alcohol, then and in that event, the reaction appears to be limited largely to involving the glycerol hydroxyl.

Another procedure which immediately suggests itself in formation of the monomeric mixed glyceride, is the procedure commonly referred to as re-esterification, cross-esterification or trans-esterification. Such procedure is well known, and in essence, would involve, for example, mixing two moles of triricinolein with one mole of the total or complete glyceride of 9,11-linoleic acid. Such migration of the acyl radicals takes place at a temperature below the pyrolytic point of triricinolein, and in the presence of an alkaline catalyst. The suitable temperature is approximately 250° C., or slightly less, and the time required may be comparatively long, for instance, 36 to 72 hours.

In any event, one obtains the dimerized mixed glyceride by any suitable procedure, and the product employed should preferably contain at least 65% or more of the dimerized mixed glyceride; some of the procedures above enumerated will yield a product markedly in excess of this value. Such mixed glyceride, if carefully prepared, has a viscosity approximately that of castor oil, or slightly blown castor oil, a distinctly darker color, and perhaps a less pleasant odor. The chemical constants, such as molecular weight, iodine number, hydroxyl number and saponification value, approximate the calculated theoretical value. It is to be noted that this intermediate is not claimed herein per se.

It is well known that ricinoleic acid compounds, particularly castor oil, can be oxidized in various ways. This is usually accomplished by subjecting a ricinoleic compound to treatment such as blowing with a suitably gaseous oxidizing medium, e. g., air, oxygen, ozone, or ozonized air. Such oxidation is commonly carried out at ordinary or superatmospheric pressure (up to about 200 lbs. per square inch) either moist or dry; and in the presence or absence of a catalyst, such as lead oleate, cobalt linoleate, or manganese oleate; or such as alpha-pinene or linseed oil, etc. Care should be taken, however, not to permit temperature rise such that excessive pyrolytic decomposition would take place. The oxidation may be vigorous, as by vigorous blowing, or may be more gradual, as by exposure in thin films to air, provided the oxidation is sufficiently prolonged to obtain the desired drastic oxidation. Usually, the time required is at least about 8 to 10 hours, under conditions most favorable to oxidation, e. g., blowing at a relatively high temperature, and for certain fatty compounds much more prolonged oxidation, e. g., several days or even weeks, is desirable, especially under conditions less favorable to rapid oxidation. In any event, whether the oxidation is produced by continued mild oxidation, or by more vigorous oxidation, a condition of drastic oxidation is indicated by changes in chemical and physical properties of the material. These changes are usually indicated by a lowered iodine value, an increased saponification value, usually an increased acetyl value, an increased specific gravity, and an increased refractive index. Thus, the iodine number may become less than 70, and even as low as about 40. The saponification value may be about 215 to about 283, and the acetyl value may be about 160 to about 200. The viscosity is increased and the drastically-oxidized product may become very heavy and stiff at ordinary temperatures. The refractive index is also increased. The color of the drastically-oxidized material may be a pale yellow or light amber, or may be a deep orange color. If oxidation is carried on long enough, a product of liver-like consistency and dark color is obtained, but since such material is more difficult to utilize, those drastically-oxidized ricinoleic compounds which are pale blown and have some fluidity at normal temperatures are preferred.

The same sort of procedure which is used to oxidize castor oil or similar ricinoleic acid derivatives, may be used to oxidize 9,11-linolo-diricinolein. Generally speaking, however, the following modification should be kept in mind.

Such material may contain a small amount of 9,11-linoleic acid or its ester resulting from incomplete polymerization. Such product is recognized as a powerful catalyst for promoting oxidation of castor oil or similar materials. Thus, it is rarely necessary to add any catalyst to hasten oxidation. Furthermore, it is rarely necessary to oxidize under pressure, although such procedure may be employed. It is rarely necessary to use oxygen instead of air. Although any suitable temperature, from 110° C. or upwards may be employed, it is my preference to oxidize at a temperature of approximately 120° C. to 130° C. and use a fairly long time interval, for instance, two to eight days, notwithstanding the fact that any of the usual procedures employed for oxidizing castor oil may be employed for oxidizing 9,11-linolo-diricinolein, and generally speaking, considerably less drastic conditions are required. The time element can be decreased somewhat, and in some instances, can be decreased significantly, particularly if in the early stage there is present any appreciable amount of the catalyst above noted, either added or naturally present. The same sort of apparatus and the same sort of procedure is employed as in the case of conventional oxidation of castor oil. The product subjected to oxidation in the instant procedure has a viscosity somewhat greater than castor oil and seems to body somewhat more readily. One precautionary step is necessary, and that is, in the final stages of oxidation, the procedure must be conducted more cautiously than with castor oil. In any event, the material, prior to oxidation, should be analyzed, and oxidation should be conducted until there is a significant change, as indicated by increase in viscosity, change in indices, such as iodine number, hydroxyl number, etc., all of which is obvious to those skilled in the art. The product should not be oxidized to the place where it is no longer soluble in the various solvents hereinafter enumerated, such as xylene, anhydrous isopropyl alcohol, carbon tetrachloride, cresylic acid, etc.

The iodine number of the raw material which is subjected to oxidation approximates that of castor oil, that is, around 90. If oxidation is drastic enough, the iodine number is reduced to approximately one-half its original value. One can readily produce three different grades, which, of course, show the effect of increased or more drastic oxidation. One obtains a light blown and light bodied material by reducing the original iodine value by approximately 25%. If oxidation is continued, or if more severe conditions of oxidation are employed, such as increased temperature, increased passage of air or addition of catalyst, one can readily reduce the iodine number by a value equivalent to 26% to 35% of the original value. Such material may be considered as a medium bodied, medium oxidized material. Similarly, more extensive oxidation or more drastic oxidation will reduce the iodine value from 36% to in excess of 50% of its original value. Such product may be considered as heavy bodied and heavily oxidized. Oxidation beyond this stage generally yields insoluble, or spongy, or rubbery masses.

In any event, the products herein contemplated are such that drastic oxidation by means of a gaseous oxygen-containing medium, results in a reduction in iodine number equivalent to at least 10% of its original value.

Light-bodied, light-blown product 9,11-linolo-diricinolein is oxidized by dry air at a temperature of 120° C. or somewhat in excess, for approximately four to five days, or slightly longer, so as to reduce the iodine value by 25% of its original value.

*Medium-bodied, moderately oxidized product*

The same procedure is followed as in Example 1, except that the time of oxidation is extended by approximately 2 or 3 days, and the temperature raised slightly, if need be, so that at the end of the period, the product shows a reduction in original iodine value equivalent to 33⅓% and an increased viscosity compared with the light-blown product previously described.

*Heavy-bodied, heavily-blown product*

The same procedure is followed as in the preceding example, except that oxidation is extended a few days longer and a somewhat higher temperature employed, if need be, so as to reduce the iodine value by a percentage equivalent to almost one-half its original value.

The new chemical products or compounds herein described, are useful for other purposes in addition to demulsification. They may be added in saponified form, for example, to many polishes to help emulsification. They may also be employed as a plasticizer in resin formation, where the acidity of the slight carboxyl is not objectionable. I have found that the chemical compounds herein described which are particularly desirable for use as demulsifiers, may also be used as break inducers in doctor treatment of the kind intended to sweeten gasoline. (See U. S. Patent No. 2,157,223, dated May 9, 1939, to Sutton.)

In the hereto appended claims the product contemplated is described in terms of method of manufacture. The reason is obviously the same reason that makes it impossible to describe blown castor oil by structural formula or combination of structural formulas. In the first place, a variety of products are formed during oxidation, and in many instances, such products either have not been identified at all, or have partially been identified. To a marked degree, the chemistry of oxidation of castor oil or my product, as herein described, is still obscure. It is also to be noted that such mode of description has been used repeatedly in the patent literature.

Attention is directed to my co-pending application, Serial No. 604,992, filed July 13, 1945.

Having thus described my invention, what I claim as new and desire to secure by Letters Patent is:

1. In the process of manufacturing a drastically oxidized dimer, the step of oxidizing a dimer of the formula

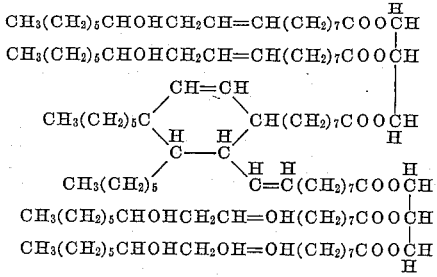

with an oxygen-containing gas at a temperature between 120° and 240° C. for a period of time sufficient to produce a reduction in iodine value equivalent to at least 10 per cent of the original value and not over 50 per cent of the original value.

2. The resultant product obtained in the process described in claim 1 wherein the oxygen containing gas is air.

3. The resultant product obtained in the process described in claim 1 wherein the oxygen containing gas is air, and the reduction in iodine value is the equivalent of at least 15 per cent and not over 25 per cent of the original value.

4. The resultant product obtained in the process described in claim 1 wherein the oxygen containing gas is air, and the reduction in iodine value is the equivalent of at least 26 per cent and not over 35 per cent of the original value.

5. The resultant product obtained in the process described in claim 1 wherein the oxygen containing gas is air, and the reduction in iodine value is the equivalent of at least 36 per cent and not over 50 per cent of the original value.

MELVIN DE GROOTE.

REFERENCES CITED

The following references are of record in the file of this patent:

UNITED STATES PATENTS

| Number | Name | Date |
|---|---|---|
| 2,347,562 | Johnston | Apr. 25, 1944 |
| 2,406,206 | De Groote | Aug. 20, 1946 |